(12) United States Patent
Heller et al.

(10) Patent No.: US 7,840,735 B2
(45) Date of Patent: Nov. 23, 2010

(54) CAN SYSTEM

(75) Inventors: Hans Heller, München (DE); Konrad Schwarz, Neubiberg (DE)

(73) Assignee: Siemens Aktiengesellschaft, Munich (DE)

( * ) Notice: Subject to any disclaimer, the term of this patent is extended or adjusted under 35 U.S.C. 154(b) by 408 days.

(21) Appl. No.: 11/922,394

(22) PCT Filed: Jul. 13, 2006

(86) PCT No.: PCT/EP2006/064237

§ 371 (c)(1),
(2), (4) Date: Dec. 18, 2007

(87) PCT Pub. No.: WO2007/009942

PCT Pub. Date: Jan. 25, 2007

(65) Prior Publication Data

US 2009/0210073 A1 Aug. 20, 2009

(30) Foreign Application Priority Data

Jul. 19, 2005 (DE) .................. 10 2005 033 700

(51) Int. Cl.
*G06F 13/00* (2006.01)
*G06F 13/14* (2006.01)

(52) U.S. Cl. .................. 710/107; 710/104; 710/108; 710/305

(58) Field of Classification Search .................. 710/100, 710/104, 107, 108, 305
See application file for complete search history.

(56) References Cited

U.S. PATENT DOCUMENTS

| 4,870,571 | A | * | 9/1989 | Frink ..................... 709/224 |
| 5,952,565 | A | | 9/1999 | Huber et al. |
| 6,292,769 | B1 | * | 9/2001 | Flanagan et al. ............... 704/3 |
| 6,470,393 | B1 | | 10/2002 | Heinrich et al. |
| 6,697,756 | B2 | | 2/2004 | Wettstein et al. |
| 6,732,254 | B1 | | 5/2004 | Slivkoff et al. |
| 6,757,600 | B2 | * | 6/2004 | Bachle ..................... 701/36 |
| 2002/0059040 | A1 | | 5/2002 | Jones et al. |
| 2002/0141438 | A1 | * | 10/2002 | Smith et al. ................. 370/465 |
| 2002/0147562 | A1 | | 10/2002 | Wettstein et al. |
| 2004/0044639 | A1 | | 3/2004 | Schoenberg et al. |
| 2004/0170195 | A1 | | 9/2004 | Slivkoff et al. |

FOREIGN PATENT DOCUMENTS

| DE | 101 09 652 A1 | 9/2002 |
| EP | 0 940 950 A2 | 9/1999 |
| EP | 1 085 720 A2 | 3/2001 |
| EP | 1 248 430 A1 | 10/2002 |

* cited by examiner

*Primary Examiner*—Mark Rinehart
*Assistant Examiner*—Jeremy S Cerullo
(74) *Attorney, Agent, or Firm*—Harness, Dickey & Pierce, P.L.C.

(57) ABSTRACT

A CAN system includes a plurality of CAN modules and a CAN bus connecting the CAN modules. In at least one embodiment, a filter device is mounted between at least one CAN module and the CAN bus, by which CAN messages transported via the CAN bus and destined for the at least one CAN module can be filtered.

17 Claims, 2 Drawing Sheets

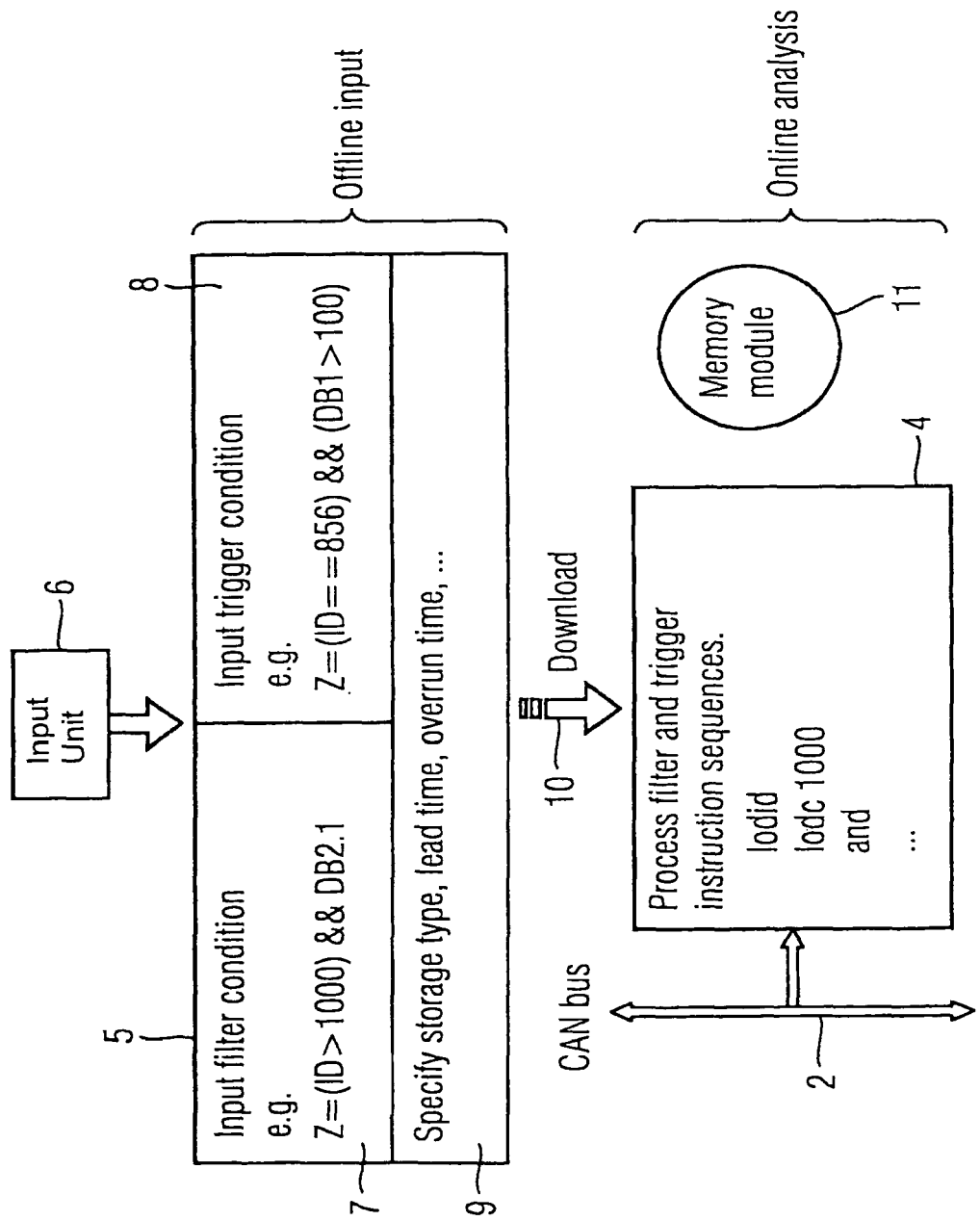

CAN SYSTEM

PRIORITY STATEMENT

This application is the national phase under 35 U.S.C. §371 of PCT International Application No. PCT/EP2006/064237 which has an International filing date of Jul. 13, 2006, which designated the United States of America and which claims priority on German Patent application 10 2005 033 700.7 filed Jul. 19, 2005, the entire contents of which are hereby incorporated herein by reference.

FIELD

At least one embodiment of the invention generally relates to a CAN system.

BACKGROUND

CAN systems are known fieldbus systems that are used in automotive engineering and to an increasing extent in other areas. CAN systems include, as a rule, a plurality of CAN modules and a CAN bus connecting the CAN modules. The CAN modules exchange CAN messages via the CAN bus.

Rather than the CAN messages being sent to a special CAN module, they are sent instead to all the CAN modules that are connected to the CAN bus. Each CAN message contains a unique identifier which defines the type of the CAN message. Each CAN module must use this identifier to decide for itself whether the message is relevant to the said CAN module, that is, whether the CAN message must be processed or whether it can be ignored.

SUMMARY

At least one embodiment of the invention is to specify a CAN system which can be used in such a way that the decision about whether or not a CAN message is relevant to the CAN module concerned can be taken in an efficient manner.

At least one embodiment of the invention provides a filter condition recording device. At least one embodiment of the invention provides a CAN system test device. Advantageous embodiments or developments of the invention are disclosed in the example embodiments below.

The inventive CAN system of at least one embodiment includes a plurality of CAN modules and a CAN bus connecting the CAN modules. Inserted between at least one CAN module and the CAN bus is a filter device, by which CAN messages transported over the CAN bus and addressed to the at least one CAN module can be filtered.

The inventive CAN system of at least one embodiment enables the CAN messages arriving at the CAN modules to be pre-filtered in order to ensure that the load imposed on the CAN modules by CAN messages is kept within bounds. This enables limits to be placed on the computing resources provided for CAN message filtering within the CAN modules. In order to make this possible, the filter device in an example embodiment rejects on behalf of each special CAN module the maximum possible number of CAN messages that are not intended for the special CAN module concerned. For this purpose the filter device should reject the greatest possible number of frequently occurring CAN message types. Preferably a dedicated filter device unit is inserted between each CAN module and the CAN bus, the unit being able to act independently of the other filter device units. It is thereby possible to provide individual filtering for every individual CAN module.

In an example embodiment, the filter device (or each filter device unit) performs the filtering in accordance with at least one freely parameterizable filter condition. Advantageously the filter device (or each filter device unit) performs filtering in accordance with at least one freely parameterizable filter trigger condition which represents a "refinement" of the filter condition. The trigger condition defines which event will cause the filtering specified by the filter condition to be triggered. The trigger condition can optionally be designed so that all CAN messages registered to a user-definable extent before and/or after the trigger event will be filtered.

In an example embodiment the filter device performs the storage of the filtered CAN messages in accordance with a freely parameterizable storage condition. The storage can then not only be used for test purposes but can also act as intermediate storage for further processing of the CAN messages by the CAN module concerned.

Preferably the filter device has an interface via which filter conditions and/or trigger conditions and/or storage conditions can be supplied to the filter device from an external filter condition recording device.

An example embodiment of the invention further provides a filter condition recording device having an input unit via which filter conditions and/or trigger conditions and/or storage conditions can be input for a filter device of an inventive CAN system. The filter condition recording device has a conversion unit for converting filter conditions and/or trigger conditions and/or storage conditions into macro instructions. Moreover the input device has an interface via which the macro instructions representing said filter conditions and/or trigger conditions and/or storage conditions can be supplied to the interface of the filter device.

In an example embodiment the filter condition recording device has a computation unit in which it is possible to compute the time needed by the filter device for filtering a CAN message according to a particular filter condition and/or trigger condition and/or storage condition. By this, it is possible to test for example whether the filter device has sufficient computing resources to perform the filtering according to the aforementioned conditions.

An example embodiment of the invention further provides a CAN system test device for testing an inventive CAN system, having an interface via which the CAN system test device can be connected to the CAN bus of the CAN system. Furthermore, the CAN system test device has an analytical unit connected to the interface so that the CAN messages transported via the CAN bus can be analyzed. Inserted between the interface and the analytical unit is a filter unit by means of which the CAN messages received via the interface are filtered.

Statements made about the filter device of the inventive CAN system also apply to the aforementioned filter device.

BRIEF DESCRIPTION OF THE DRAWINGS

The invention will now be explained in greater detail below with the aid of an example embodiment and with reference to the accompanying drawings, in which:

FIG. 2 shows the interworking between an example embodiment of the inventive filter condition recording device and an example embodiment of the inventive CAN system.

DETAILED DESCRIPTION OF THE EXAMPLE EMBODIMENTS

Figure 1:
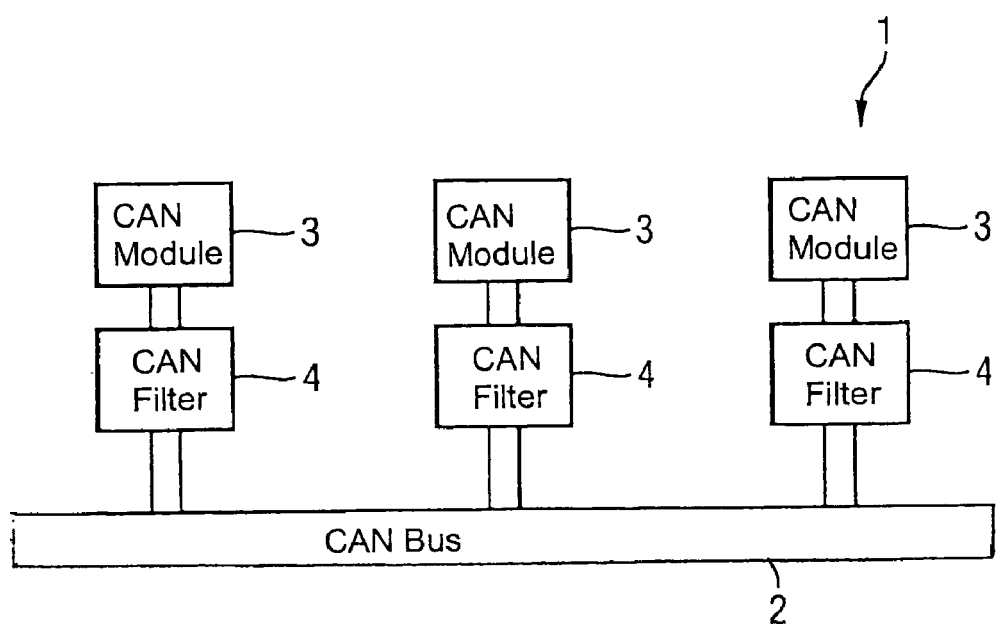
FIG. 1 shows an example embodiment of the inventive CAN system.

FIG. 1 shows an example embodiment of the inventive CAN system 1. The CAN system 1 includes a CAN bus 2 and a plurality of CAN modules 3 connected to the CAN bus 2. In this embodiment a filter device 4 is inserted between each CAN module 3 and the CAN bus 2. Each filter device 4 filters the CAN messages transported via the CAN bus 2 on an individual basis so that each of the CAN modules 3 receives individually filtered CAN messages.

FIG. 2 shows an example embodiment of the inventive filter condition recording device 5. An input unit 6 is used to enter a filter condition 7 and a trigger condition 8 into the filter condition recording device 5. Moreover, the input unit 6 is used to supply a storage condition 9 to the filter condition recording device 5. The filter condition recording device 5 is then connected to one or more of the filter devices 4 via an interface 10 so that the filter conditions 7 and/or trigger conditions 8 and/or storage conditions 9 can be supplied to said filter devices 4. The conditions are converted in advance into suitable macro instructions in the filter condition recording unit 5. The macro instructions are in turn converted into suitable machine code within the filter devices 4.

The CAN messages filtered by the filter devices 4 are stored in a memory module 11 which can, for example, be part of the CAN modules 3.

Further aspects of embodiments of the invention will be explained in the description which follows.

In CAN bus systems for communication within a motor car, messages are sent via the bus to all connected controllers rather than to a specific addressee. Each of these messages contains a unique identifier which defines the type of the message. The recipient of a message uses this identifier to decide whether the message is relevant to it, that is, whether it must process the message or can ignore it.

Such decisions are taken as efficiently as possible. For this purpose the controller contains special registers which can be used to preselect messages. The identifier is compared with the register contents by a process known as masking. If a match with one of the registers is found, the message is accepted; otherwise it is rejected as irrelevant. This preselection is not necessarily exhaustive, which is to say that non-relevant messages can be allowed through, but all relevant messages must be accepted.

According to an embodiment of the invention an optimum mask assignment of the registers is created when the maximum possible number of unwanted messages is rejected and all relevant messages are accepted. weightings of the messages are advantageously taken into account: Some message types occur more frequently. It is therefore more important to reject frequently occurring non-relevant message types than those that occur infrequently.

The problem for a controller is given by the list of identifiers of relevant messages and the list of identifiers of non-relevant messages together with their weights. According to an embodiment of the invention an optimum register assignment for each such specification is computed by way of a heuristic optimization method. In this way the sum of the weights of the non-relevant messages that are accepted is kept to a minimum.

The inventive CAN system has the following advantages: Highly effective preselection; rapid automatic computation of the register assignment; easy adaptability when the requirements placed on a controller change.

An embodiment of the invention may preferably be embodied by way of two software modules: The first module serves to specify the filter conditions and the trigger conditions. It is assumed here that the specification takes place offline. The user formulates the equations for the filter conditions and trigger conditions, and the basis on which storage occurs. When this step is complete, the program translates these specifications into a sequence of macro instructions. These instruction sequences (one for each of the trigger conditions and one for the filter condition) are then downloaded into the runtime system (i.e. the CAN system). The runtime system then executes the instruction sequences, thereby producing the actual data filtering.

The manufacturer of the CAN modules and/or filter devices still has the task of adapting the processors to the message filter. The problem is largely reduced to translating the macro instructions of the message filter into a sequence of true machine instructions (assembler instructions). Naturally the download interface also has to be provided.

CAN is one of the most popular fieldbus systems; it is used in automobile manufacture and also to an increasing extent in industry generally. The system is characterized by its high reliability: It is practically impossible for an incorrect message to be analyzed mistakenly by a node. A CAN message starts with the 11-bit identifier which virtually represents the memory address in a "global process image". A number of further management bits are followed by up to eight bytes of payload data and a 16-bit CRC (cyclic redundancy check) checksum.

Around 5000 CAN messages per second can be transported on a heavily loaded bus. It is clear from this that a vast amount of data accumulates in a very short time. An engineer wanting to sort a few special data sets from this abundance of data would be practically lost without technical aids.

For this purpose, an embodiment of the invention provides a CAN message filter with user-definable parameters; the filter can be used in a CAN system test device. The user must be able to specify any desired filter condition. Only those messages which satisfy this filter condition will then be picked out from all the CAN messages.

An example of a filter condition is given below. The user wishes to register those CAN messages which have identifiers in the range 1000 to 1200, and in which the third bit in the second data word is set. The corresponding filter condition is formulated as follows:

$$Z=(ID>=1000)\&\&(ID<1200)\&\&DB2.3$$

A trigger condition can also be formulated. This specifies the time at which the filter condition is intended to be effective. This enables the user to parameterize the test device in a very flexible way. For instance a test of the following kind can be formulated without difficulty: "I am interested in the oil temperature curve in a process, but only from the time when the speed has exceeded a predefined limit value".

The syntax for the trigger condition can advantageously be embodied analogously to the filter condition syntax.

According to an embodiment of the invention it also possible to implement other kinds of triggers: A lead time and an overrun time can be specified. Then if a trigger occurs, the specified number of messages before and after the trigger event are registered. It is also possible to specify whether the memory in which the filtered messages are stored has to be filled once only, or whether it has to register the last N messages on the recirculating buffer principle.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A Controller Area Network (CAN) system, comprising:
a plurality of CAN modules;
a CAN bus connecting the CAN modules;
a filter device, inserted between at least one of the plurality of CAN modules and the CAN bus, to filter CAN messages transported over the CAN bus and addressed to the at least one of the plurality of CAN modules; and
a filter condition recording device having an input unit to enter filter conditions for the filter device and a conversion unit to convert the filter conditions into macro instructions, the input device including an interface via which the macro instructions representing the filter conditions are supplyable to the interface of the filter device.

2. The CAN system as claimed in claim 1, wherein the filter device is further usable to reject the maximum possible number of CAN messages that are not intended for the at least one of the plurality of CAN modules.

3. The CAN system as claimed in claim 2, wherein the filter device is further used to reject the greatest possible number of frequently occurring CAN message types.

4. The CAN system as claimed in claim 1, wherein the filter device is further usable to reject the greatest possible number of frequently occurring CAN message types.

5. The CAN system as claimed in claim 1, wherein the filter device is usable to perform the filtering in accordance with at least one freely parameterizable filter condition.

6. The CAN system as claimed in claim 5, wherein the filter device is further usable to perform the filtering in accordance with at least one freely parameterizable filter trigger condition.

7. The CAN system as claimed in claim 6, wherein the trigger condition is designed so that all CAN messages registered at least one of immediately before and immediately after the trigger event are filtered.

8. The CAN system as claimed in claim 6, wherein the filter device is further used to perform the storage of the filtered CAN messages in accordance with a freely parameterizable storage condition.

9. The CAN system as claimed in claim 5, wherein the filter device is further usable to perform the storage of the filtered CAN messages in accordance with a freely parameterizable storage condition.

10. The CAN system as claimed in claim 5, wherein the filter device includes an interface via which filter conditions are supplyable to the filter device from outside.

11. The CAN system as claimed in claim 1, further comprising a computation unit to compute the time needed by the filter device for filtering a CAN message according to a particular filter condition.

12. A Controller Area Network (CAN) system test device for testing a CAN system as claimed in claim 1, comprising:
an interface, to connect the CAN system test device to the CAN bus of the CAN system,
an analytical unit, connected to said interface, to analyze CAN messages transported in the CAN bus, and
a filter device, inserted between the interface and the analytical unit, to filter the CAN messages received via the interface.

13. The CAN system test device as claimed in claim 12, wherein the filter device is useable to perform the filtering in accordance with at least one freely parameterizable filter condition.

14. The CAN system test device as claimed in claim 13, wherein the filter device is usable to perform the filtering in accordance with at least one freely parameterizable filter trigger condition.

15. The CAN system test device as claimed in claim 14, wherein the trigger condition is designed so that all CAN messages at least one of registered immediately before and registered immediately after the trigger event are filtered.

16. The CAN system test device as claimed in claim 12, wherein the filter device is usable to perform the storage of the filtered CAN messages in accordance with a freely parameterizable storage condition.

17. The CAN system test device as claimed in claim 12, wherein the filter device includes an interface via which filter conditions are supplyable to the filter device from outside.

* * * * *